United States Patent [19]

Johnson, Jr.

[11] Patent Number: 4,693,847

[45] Date of Patent: Sep. 15, 1987

[54] METHOD OF PREPARING HOT-MELT STABLE ROSIN ESTER WITH ORGANIC ESTER OF HYPOPHOSPHOROUS ACID CATALYST

[75] Inventor: Robert W. Johnson, Jr., Savannah, Ga.

[73] Assignee: Union Camp Corporation, Wayne, N.J.

[21] Appl. No.: 931,552

[22] Filed: Nov. 14, 1986

[51] Int. Cl.$^4$ ............................................. C09F 7/00
[52] U.S. Cl. ...................................... 260/104; 260/103
[58] Field of Search ................................. 260/104, 103

[56] References Cited

U.S. PATENT DOCUMENTS 2,729,660  1/1956  Harrison ............................. 260/104
4,548,746  10/1985  Duncan et al. ..................... 260/104

Primary Examiner—Harold D. Anderson
Attorney, Agent, or Firm—Edward J. Sites

[57] ABSTRACT

Organic esters of hypophosphorous acid are used to catalyze the esterification of rosin with a polyol. The method is an improvement in that reaction time is shortened and the ester product exhibits improved heat stability.

9 Claims, No Drawings

METHOD OF PREPARING HOT-MELT STABLE ROSIN ESTER WITH ORGANIC ESTER OF HYPOPHOSPHOROUS ACID CATALYST

The invention relates to methods of preparing esters of rosin and more particularly relates to the preparation of polyol esters of tall oil rosin.

BACKGROUND OF THE INVENTION

The prior art is replete with descriptions of methods for preparing polyol esters of rosin. Representative of such descriptions are those found in the U.S. Pat. Nos. 2,369,125; 2,729,660; 3,780,012; 3,780,013; 4,548,746; and 4,585,584.

The method of the present invention is an improvement over prior art methods in that it employs an esterification catalyst giving a product of improved hot-melt stability.

SUMMARY OF THE INVENTION

A novel method of preparing a polyol ester of a rosin is disclosed which comprises esterifying the rosin with the polyol in the presence of a catalytic proportion of an organic ester of hypophosphorous acid.

The polyol ester of rosin made in accordance with the method of the invention are useful as tackifier ingredients in hot-melt adhesive compositions such as EVAC hot-melt adhesives.

DETAILED DESCRIPTION OF THE INVENTION

The rosins which may be esterified by the method of the invention are well known compounds as are methods of their preparation. Rosin is mainly a mixture of $C_{20}$, fused-ring, monocarboxylic acids, typified by levopimaric and abietic acids. The rosins include gum rosin, wood rosin and tall oil rosin. The method of the invention is particularly advantageous when applied to esterification of tall oil rosin. The rosin may be hydrogenated, disproportionated or polymerized rosin as well as crude, untreated rosin.

The polyols employed in the method of the invention are also well known and are represented by diols such as ethylene glycol, propylene glycol, diethylene glycol, triethylene glycol, tetraethylene glycol, trimethylene glycol; triols such as glycerol; tetrols such as pentaerythritol; hexols such as mannitol and sorbitol and like polyols. The method of the invention is particularly advantageous when the polyol selected is pentaerythritol.

The esterfication of the invention is carried out in the presence of a catalytic proportion of an organic ester of hypophosphorous acid. A catalytic proportion is generally within the range of from about 0.02 to 1.0 percent by weight of the rosin and preferably 0.1 to 0.5 percent.

Organic esters of hypophosphorous acid are well known and are represented for example by aliphatic esters such as 2-ethylhexyl phosphinic acid and the like; aromatic esters such as benzene phosphinic acid and the like.

Esterification is advantageously carried out by bringing together the rosin and an equivalent excess of the polyol (up to 20 percent excess) in an appropriate reaction vessel and heating the mixture to a temperature within the range of from about 150° C. to 300° C., preferably 180° C. to 280° C.

Esterification may be carried out under a broad range of pressure conditions including sub-, super- and atmospheric pressures. Advantageously, atmospheric pressures are employed.

Advantageously, the esterification reaction can be accomplished in the presence of an inert atmosphere, such as a nitrogen gas atmosphere provided by a nitrogen purge of the reaction vessel prior to addition of the reactants and a nitrogen sparge during the reaction. Since light color is a desirable property of the rosin ester and the color is sensitive to oxygen exposure, oxygen exposure is preferably minimized.

Progress of the esterification may be followed by conventional analysis of the reaction mixture to determine the acid number. The esterification may be terminated to any desired acid number. In general, the reaction is accepted as sufficiently complete when the acid number drops to 15 or lower.

The following examples describe the manner and the process of making and using the invention and set forth the best mode of carrying out the invention but are not to be considered as limiting the invention.

The softening points (sp) were determined by the Ball and Ring method of ASTM test method 28-58T.

EXAMPLE 1

To a suitable reaction vessel equipped with a stirrer and thermometer were added 100 parts of disproportionated rosin having a color of 4 Gardner. Next there was added 11 parts of pentaerythritol and 0.25% benzene phosphinic acid as the catalyst, based on the weight of the rosin. The mixture was heated to 275° C. for 5½ hours. The resultant rosin ester had a color of 5 Gardner, an acid number of 7 and a sp of 99° C.

Hot-melt adhesives were made up and then tested by heating to 175° C. in a forced air oven and observing the percentage of skinning which occurred over periods of time and the degree of viscosity change. The test results are given in the Table 1, below for the product of Example 1 and a comparative product made with lithium carbonate.

TABLE 1

| | Hot Melt Properties | | | | |
|---|---|---|---|---|---|
| | Color G | | Skinning, % | | Viscosity |
| Example | Initial | Final | 24 hr | 48 hr | 96 hr | Change, % |
| 1 | 4— | 8 | 0 | 0 | 0 | +16 |
| Lithium Carbonate | 5— | 12 | 35 | 50 | 70 | −20 |

What is claimed is:

1. A method of preparing a polyol ester of rosin, which comprises; esterifying the rosin with the polyol in the presence of a catalytic proportion of an organic ester of hypophosphorous acid.

2. The method of claim 1 wherein the rosin is tall oil rosin.

3. The method of claim 2 wherein the rosin is a disproportionated rosin.

4. The method of claim 3 wherein the polyol is pentaerythritol.

5. The method of claim 1 wherein the polyol is pentaerythritol.

6. The method of claim 1 wherein the proportion of catalyst is within the range of from about 0.01 to 1.0 percent by weight of the rosin.

7. The method of claim 6 carried out at a temperature within the range of from about 150° C. to 300° C.

8. The method of claim 1 carried out under an inert gas atmosphere.

9. The method of claim 1 wherein the catalyst is benzene phosphinic acid.

* * * * *